United States Patent
Diedrich et al.

(10) Patent No.: US 10,730,485 B2
(45) Date of Patent: Aug. 4, 2020

(54) VEHICLE SENSOR SYSTEM

(71) Applicant: Ford Global Technologies, LLC, Dearborn, MI (US)

(72) Inventors: Jonathan Diedrich, Carleton, MI (US); Brian Bennie, Sterling Heights, MI (US); Cynthia M. Neubecker, Westland, MI (US); Cheri Lyn Hansen, Canton, MI (US); Mahmoud Yousef Ghannam, Canton, MI (US); Adil Nizam Siddiqui, Farmington Hills, MI (US); Haron Abdel-raziq, Dearborn, MI (US); Somak Datta Gupta, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 310 days.

(21) Appl. No.: 15/702,656

(22) Filed: Sep. 12, 2017

(65) Prior Publication Data
US 2019/0077380 A1    Mar. 14, 2019

(51) Int. Cl.
| | | |
|---|---|---|
| *B60S 1/56* | (2006.01) | |
| *G02B 27/00* | (2006.01) | |
| *B60S 1/52* | (2006.01) | |
| *B60S 1/04* | (2006.01) | |
| *B08B 1/02* | (2006.01) | |

(Continued)

(52) U.S. Cl.
CPC .............. *B60S 1/566* (2013.01); *B60S 1/52* (2013.01); *G02B 27/0006* (2013.01); *B08B 1/008* (2013.01); *B08B 1/02* (2013.01); *B08B 1/04* (2013.01); *B60S 1/0411* (2013.01)

(58) Field of Classification Search
CPC .......... B60S 1/0848; B60S 1/566; B60S 1/56; B60S 1/08; B60S 1/0411; G02B 27/00; G02B 27/006; G02B 11/048; G01N 2021/152; G01N 21/15; G01N 7/12; B08B 1/008; B08B 1/02; B08B 1/04; B08B 3/04; G03B 17/02; G03B 17/568; G03B 17/56; H04N 5/2171; H04N 5/2254; B60R 11/04
USPC ....... 15/250.1, 250.22, 250.002, 256.5, 97.1, 15/102, 103, 103.5; 359/507, 509
See application file for complete search history.

(56) References Cited

U.S. PATENT DOCUMENTS 1,225,746 A * 5/1917 Bauer .................... B60S 1/0411
        15/250.1
1,613,319 A * 1/1927 Fuchs ....................... A47L 1/02
        15/250.3

(Continued)

FOREIGN PATENT DOCUMENTS

| DE | 102005021672 | * 11/2006 |
|---|---|---|
| DE | 102008027430 A1 | 2/2009 |

(Continued)

*Primary Examiner* — Gary K. Graham
(74) *Attorney, Agent, or Firm* — Frank A. MacKenzie; Bejin Bieneman PLC

(57) ABSTRACT

A system includes a base defining an opening. The system includes a pair of gaskets supported by the base, the opening disposed between the gaskets. The system includes a pair of pads supported by the base, the gaskets disposed between the pads. The system includes a transparent shield supported by the base and movable between a first position and a second position, the shield abutting one of the pads in the first position and the other of the pads in the second position.

18 Claims, 6 Drawing Sheets

(51) Int. Cl.
*B08B 1/00* (2006.01)
*B08B 1/04* (2006.01)

(56) References Cited

U.S. PATENT DOCUMENTS

| | | | |
|---|---|---|---|
| 5,068,770 A * | 11/1991 | Baziuk | B60Q 1/0005 |
| | | | 15/250.01 |
| 7,257,855 B2 * | 8/2007 | Mayo | B60S 1/52 |
| | | | 15/250.01 |
| 9,380,190 B2 * | 6/2016 | Pawlowski | H04N 5/2171 |
| 2012/0000024 A1 | 1/2012 | Layton | |
| 2016/0170203 A1 | 6/2016 | Weigert et al. | |

FOREIGN PATENT DOCUMENTS

| | | | |
|---|---|---|---|
| DE | 102014004172 | * | 9/2014 |
| DE | 102015217781 A1 | | 3/2017 |
| GB | 2501500 A | | 10/2013 |
| JP | 2005-77778 | * | 3/2005 |
| JP | 5601249 B2 | | 10/2014 |
| JP | 3201187 U | | 11/2015 |
| KR | 19990008399 U | | 3/1999 |

* cited by examiner

VEHICLE SENSOR SYSTEM

BACKGROUND

A vehicle may receive information from an optical sensor. The information from the optical sensor may be used to navigate the vehicle, e.g., to avoid vehicle collisions, maintain a lane of travel, etc. However, the optical sensor may be rendered wholly or partially inoperable, e.g., when a contaminant such as dirt blocks a field of view of the sensor.

DETAILED DESCRIPTION

Figure 1:
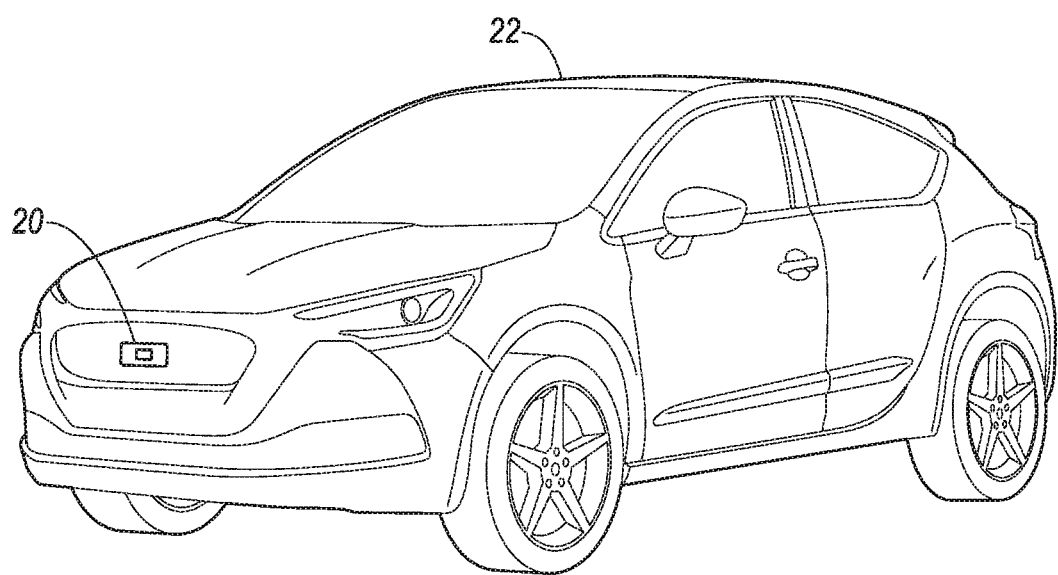
FIG. 1 is a perspective view of an example vehicle with an example sensor system.

A system includes a base defining an opening. The system includes a pair of gaskets supported by the base, the opening disposed between the gaskets. The system includes a pair of pads supported by the base, the gaskets disposed between the pads. The system includes a transparent shield supported by the base and movable between a first position and a second position, the shield abutting one of the pads in the first position and the other of the pads in the second position.

The base may include a first beveled surface and a second beveled surface opposite the first beveled surface, the opening disposed therebetween.

The system may include an optical sensor defining a field of view, the opening and the transparent shield in the first position and the second position may be located within the field of view.

The pads may be movable relative to the base and the shield.

The system may include a shaft rotatably supported by the base, wherein each of the pads defines a loop disposed around the shaft.

The system may include a nozzle positioned to provide fluid to at least one of the pads.

The gaskets may extend in a direction that is perpendicular to movement of the shield from the first position to the second position.

The system may include a user interface and a computer programmed to actuate the shield between the first position and the second position in response to a user input to the user interface.

The system may include a computer programmed to actuate the shield between the first position and the second position upon a determination that the shield is contaminated.

A system includes a base defining an opening. The system includes a pad supported by the base. The system includes a transparent shield supported by the base and movable between a first position and a second position, the shield covering the opening in the first position and abutting the pad in the second position. The pad is movable relative to the base and the shield.

The system may include a shaft rotatably supported by the base, wherein the pad may define a loop disposed around the shaft.

The system may include a second shaft spaced from the shaft, the loop may be disposed around the second shaft, and the opening may be located between the shaft and the second shaft.

The system may include a second pad spaced from the pad and movable relative to the base and the shield, the opening may be disposed between the pad and the second pad.

The system may include a gasket disposed between the pad and the opening.

The system may include a nozzle positioned to provide fluid to the pad.

Movement of the pad may define a direction that is perpendicular to movement of the shield between the first position and the second position.

The system may include an optical sensor defining a field of view, the opening and the transparent shield in the first position and the second position located within the field of view.

The system may include a computer programmed to concurrently actuate the shield from the first position to the second position and movement of the pad.

The system may include a computer programmed to actuate the shield from the first position to the second position and to actuate movement of the pad after actuation of the shield.

The system may include a computer programmed to actuate the shield between the first position and the second position at time intervals.

With reference to the Figures, a sensor system 20 for a vehicle 22 includes a base 24 defining an opening 26. The sensor system 20 includes a pair of gaskets 28 supported by the base 24. The opening 26 is disposed between the gaskets 28. The sensor system 20 includes a pair of pads 30 supported by the base 24. The gaskets 28 are disposed between the pads 30. The sensor system 20 includes a transparent shield 32 supported by the base 24 and movable between a first position and a second position. The transparent shield 32 abuts one of the pads 30 in the first position and the other of the pads 30 in the second position. The sensor system 20 protects an optical sensor 36 of the sensor system 20 and aids in maintaining an uncontaminated field of view FV.

Figure 2:
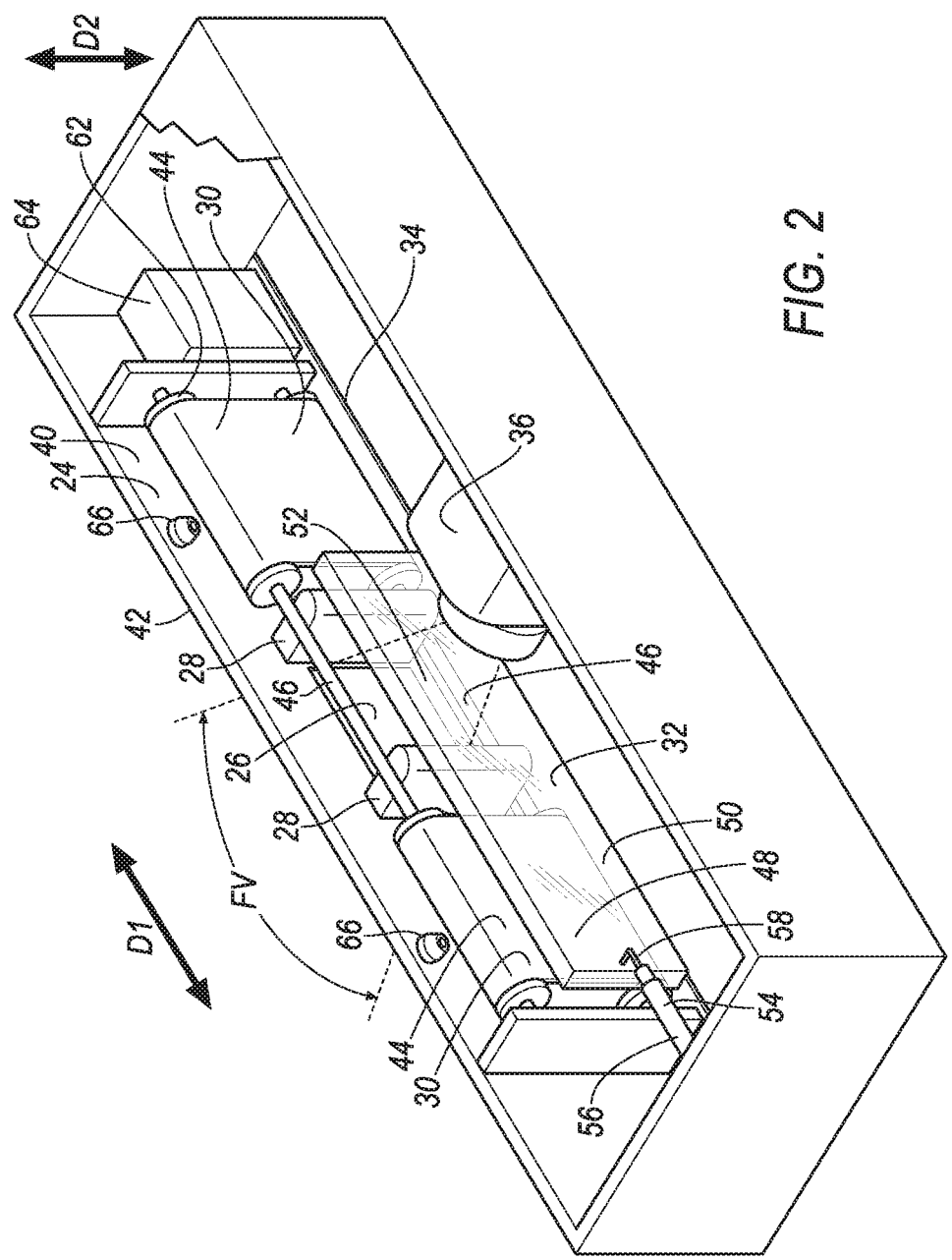
FIG. 2 is a cutaway perspective view of the example sensor system of FIG. 1.
Figure 3:
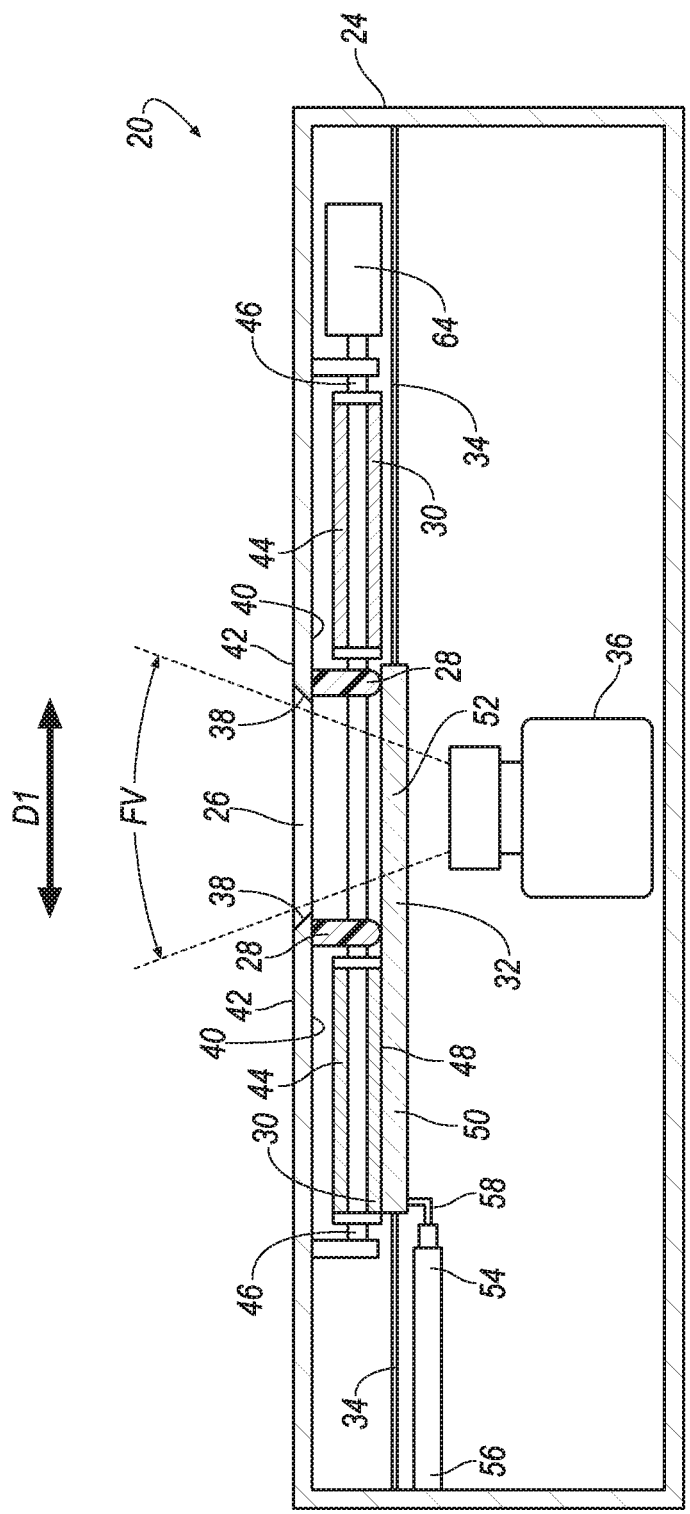
FIG. 3 is a top view of the example sensor system of FIG. 1 with a transparent shield in a first position.
Figure 4:
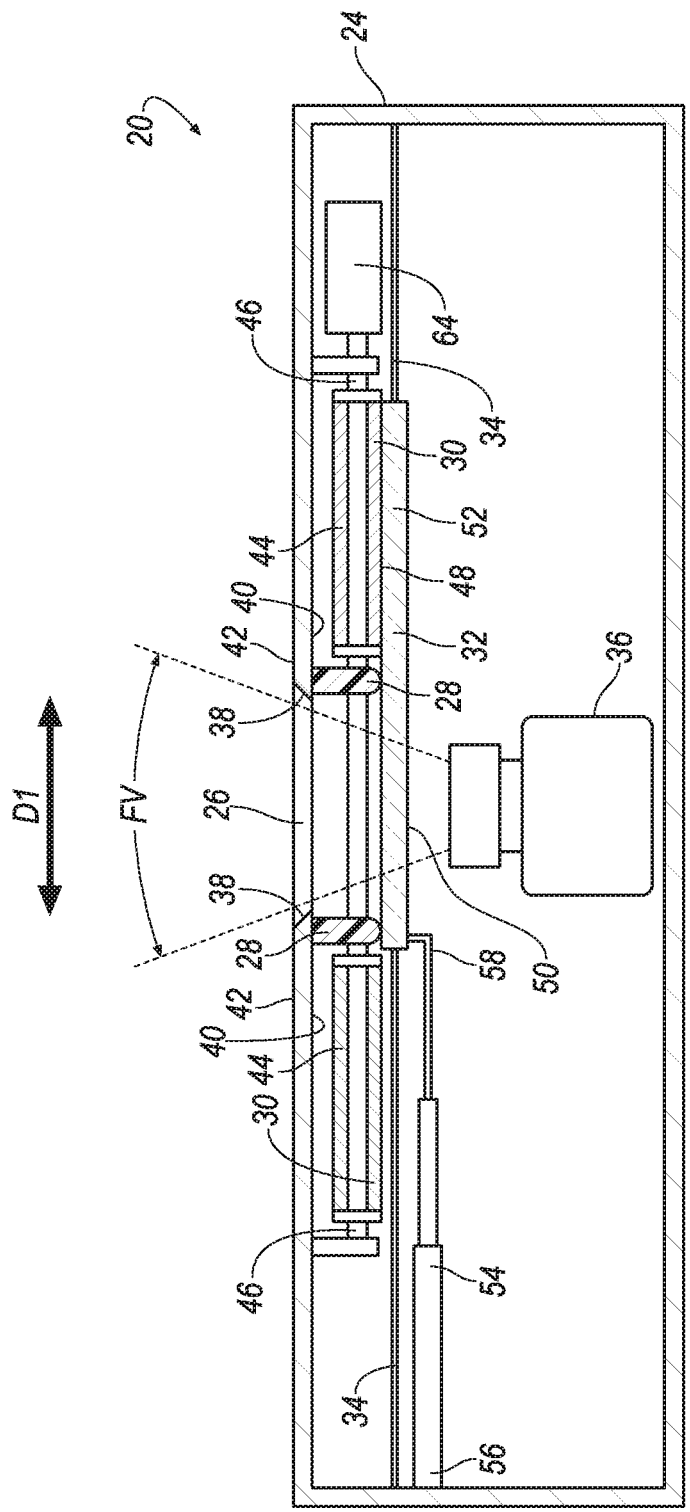
FIG. 4 is a top view of the example sensor system of FIG. 1 with the transparent shield in a second position.

The base 24, shown in FIGS. 2 through 4, may be formed of metal, plastic, or any other suitable material. For example, the base 24 may include walls, a top panel, a bottom panel, etc., to enclose and protect components therein from conditions such as rain, snow, dirt, etc. The base 24 may include a track 34. The track 34 may be defined by one or more channels, grooves, lips, etc. The base 24 may be a component of the vehicle 22.

The base 24 defines the opening 26. The opening 26 permits light to travel therethrough, e.g., to be received by the optical sensor 36, i.e., the opening 26 is within a field of view FV of the optical sensor 36. The base 24 may include a first beveled surface 38 and a second beveled surface 38 opposite the first beveled surface 38 with the opening 26 disposed therebetween, as shown in FIGS. 3 and 4. The first beveled surface 38 and the second beveled surface 38 may be angled such that the opening 26 narrows as the opening 26 approaches the optical sensor 36. For example, the base 24 may include an inner surface 40 and an outer surface 42. The first beveled surface 38 and the second beveled surface 38 may connect the inner surface 40 to the outer surface 42. The opening 26 may be larger, e.g., wider, at the outer surface 42 than at the inner surface 40.

The optical sensor 36, shown in FIGS. 2 through 4, and FIG. 6, detects light. The optical sensor 36 may be a scanning laser range finder, a light detection and ranging (LIDAR) device, an image processing sensor such as a camera, or any other sensor that detects light. The optical sensor 36 may be supported by the base 24. The optical sensor 36 may be fixed to the base 24 to prevent relative movement therebetween, e.g., with a fastener, adhesive, etc.

The optical sensor 36 defines the field of view FV. The field of view FV is an area relative to the optical sensor 36 from which light is detected by the optical sensor 36. Light generated by, and/or reflected off, an object within the field of view FV, and towards the optical sensor 36, is detectable by the optical sensor 36, provided such light is not blocked before reaching the optical sensor 36. The field of view FV may be circular. For example, the field of view FV may be defined by an angular range, e.g., 90 degrees, rotated about an axis relative to an orientation of the optical sensor 36. The field of view FV may be rectangular. For example, the field of view FV may be defined by a horizontal angular range, e.g., 90 degrees, and a vertical angular range, e.g., 60 degrees. Similarly, the field of view FV may be square.

The pair of gaskets 28, shown in FIGS. 2 through 4, are supported by the base 24. The opening 26 is disposed between the pair of gaskets 28. To put it another way, one of the gaskets 28 is spaced from the other of the gaskets 28 with the opening 26 located therebetween. The gaskets 28 may abut the transparent shield 32. The gaskets 28 may extend in a direction that is perpendicular to movement of the transparent shield 32 from the first position to the second position. To put it another way, the transparent shield 32 may move in a lateral direction D1 between the first position and the second position, and the gaskets 28 may extend in a longitudinal direction D2. The gaskets 28 wipe the transparent shield 32 when the transparent shield 32 is moved between the first position and the second position, e.g., to remove contaminants from the transparent shield 32. The gaskets 28 may be formed of rubber, silicone, or other suitable material. Although shown in the Figures a being two separate pieces of material, it is to be understood that the gaskets 28 may be made of a single piece of material, e.g., a single strip of rubber that partially or completely surrounds a perimeter of the opening 26. The gaskets 28 may be secured to the base 24, e.g., with an adhesive, etc.

The pair of pads 30, shown in FIGS. 2 through 4, are supported by the base 24. The gaskets 28 are disposed between the pads 30. To put it another way, one of the pads 30 is spaced from the other of the pads 30 with the gaskets 28 located therebetween. Similarly, the opening 26 is disposed between the pads 30.

The pads 30 clean the transparent shield 32, e.g., upon relative motion therebetween. The relative motion between the pads 30 and the transparent shield 32 may be provided by movement of the pads 30 and/or the transparent shield 32. The pads 30 may be formed of a fabric, such as a microfiber, or other suitable material.

The pads 30 may be movable relative to the base 24. The pads 30 may be movable relative to the transparent shield 32. For example, each of the pads 30 may define a loop 44 disposed around a shaft 46. The loop 44 abuts the shaft 46 such that rotation of the shaft 46 may cause movement of the pad 30. The loop 44 of each pad 30 may be disposed around a second shaft 46.

Movement of the pad 30 may define a direction that is perpendicular to movement of the transparent shield 32 between the first position and the second position. For example, the pad 30 may move in the longitudinal direction D2.

The direction of movement of the pad 30 may be defined by a direction of movement of a portion 48 of the pads 30 in contact with the transparent shield 32. For example, where the pad 30 defines the loop 44, the portion 48 of the pad in contact with the transparent shield 32 may move in a first direction while a remainder of the pad 30, e.g., not in contact with the transparent shield 32, may move in a second direction that is different than the first direction. In such situation, the direction of movement defined by the pad 30 is the first direction.

The transparent shield 32 protects the optical sensor 36, e.g., from dirt, water, and other objects that may damage the optical sensor 36. The transparent shield 32 may be rectangular in shape. The transparent shield 32 may extend from a first end 50 to a second end 52 opposite the first end 50. The transparent shield 32 is positioned within the field of view FV of the optical sensor 36. The transparent shield 32 permits light to pass therethrough, e.g., to the optical sensor 36. The transparent shield 32 may be formed of glass, plastic or other suitable transparent material. The transparent shield 32 may be supported by the base 24.

The transparent shield 32 is movable between the first position and the second position. The transparent shield 32 may translate between the first position and the second position, e.g., along the lateral direction D1. For example, the transparent shield 32 may be slidably supported by the track 34.

In the first position, shown in FIGS. 2 and 3, the transparent shield 32 abuts one of the pads 30. For example, the first end 50 of the transparent shield 32 in the first position may abut one of the pads 30. In the first position, the transparent shield 32 covers the opening 26. For example, the second end 52 of the transparent shield 32 in the first position may be located between the opening 26 and the optical sensor 36 and within the field of view FV of the optical sensor 36. Light entering the opening 26 may pass through the second end 52 of the transparent shield 32 and be detected by the optical sensor 36.

In the second position, shown in FIG. 4, the transparent shield 32 abuts the other of the pads 30. For example, the second end 52 of the transparent shield 32 in the second positon may abut the other of the pads 30. In the second position, the transparent shield 32 covers the opening 26. For example, the first end 50 of the transparent shield 32 in the second position may be located between the opening 26 and the optical sensor 36, and within the field of view FV of the optical sensor 36. Light entering the opening 26 may pass through the first end 50 of the transparent shield 32 and be detected by the optical sensor 36.

The sensor system 20 may include a linear actuator 54. The linear actuator 54 may include a first end 56 opposite a second end 58. Actuation of the linear actuator 54 varies a distance between the first end 56 and the second end 58, e.g., by lengthening or shortening the linear actuator 54. The linear actuator 54 may be a screw type including a threaded shaft and hole, a hydraulic type including a piston and cylinder, a rack and pinion type, etc. The first end 56 of the linear actuator 54 may be secured to the base 24 and the second end 58 may be secured to the transparent shield 32.

Actuation of the linear actuator 54 may move the transparent shield 32 between the first position and the second position, e.g., in response to an instruction from a computer 60. Other devices may be used to move the transparent shield 32 such as springs, electromagnets, pulleys, etc.

The shaft 46 may be rotatably supported by the base 24. The shaft 46 may extend along the lateral direction D1. To put it another way, the shaft 46 may extend parallel to the direction of movement of the transparent shield 32 between the first position and the second position. The shaft 46 may be located above the opening 26. The shaft 46 abut the pads 30 and transfer rotational movement of the shaft 46 to the pads 30.

The second shaft 46 may be rotatably supported by the base 24. The second shaft 46 is spaced from the shaft 46. The second shaft 46 may extend along the lateral direction D1. The second shaft 46 may be located below the opening 26. The opening 26 may be located between the shaft 46 and the second shaft 46. The second shaft 46 may abut the pads 30.

The shaft 46 and/or the second shaft 46 may be coupled to a motor 64, shown in FIGS. 2 through 4, and FIG. 6. The motor 64 may be supported by the base 24. The motor 64 may be configured to rotate the shaft 46 and/or the second shaft 46, e.g., in response to an instruction from the computer 60. For example, the motor 64 may be coupled to the shaft 46 and/or the second shaft 46 with a gearbox that transfers rotational movement of the motor 64 to the shaft 46 and/or the second shaft 46, thereby providing movement to the pads 30. Other devices may be used to move the pads 30 including springs, electromagnets, linear actuators, etc.

The sensor system 20 may include a nozzle 66, shown in FIGS. 2 through 5, positioned to provide fluid to at least one of the pads 30. For example, the nozzle 66 may be supported by the base 24 and positioned to direct fluid at one of the pads 30. The fluid may be a liquid. For example, the nozzle 66 may be in communication with, and provided liquid from, a washer system 68, shown in FIGS. 5 and 6, of the vehicle 22 e.g., in response to an instruction from the computer 60. Similarly, the sensor system 20 may include one or more additional nozzles 66, e.g., positioned to provide fluid at least to the other of the pads 30.

Figure 6:
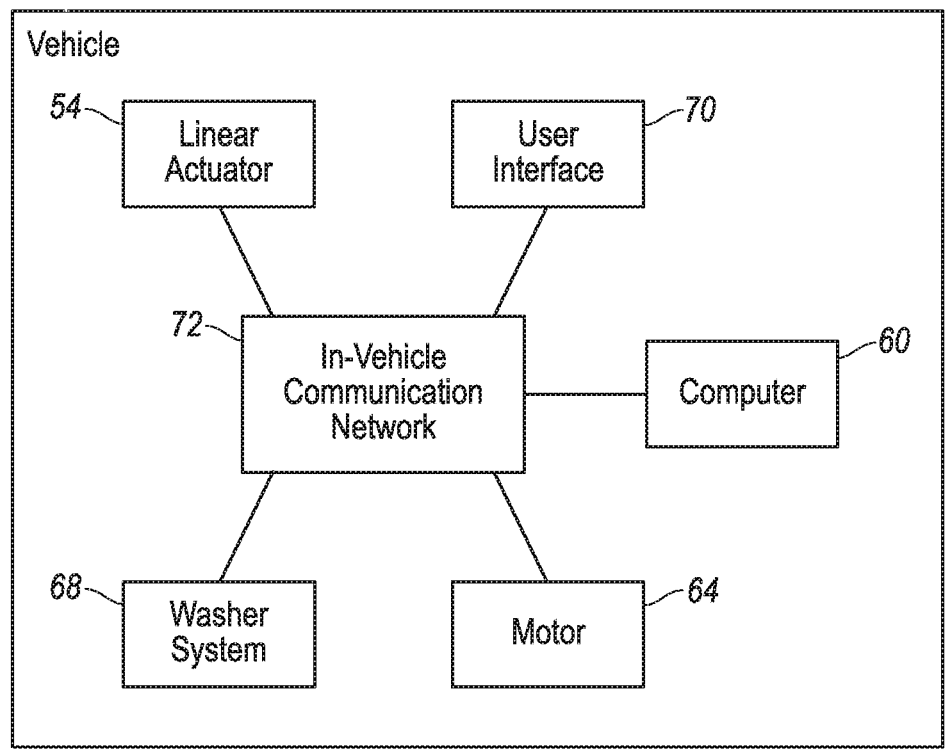
FIG. 6 is a block diagram of the example vehicle of FIG. 1.

The vehicle 22, shown in FIGS. 1 and 6, may be any passenger or commercial automobile such as a car, a truck, a sport utility vehicle, a crossover vehicle, a van, a minivan, a taxi, a bus, etc. The vehicle 22 may include the sensor system 20, the washer system 68, a user interface 70, an in-vehicle communication network 72, and the computer 60.

The vehicle 22 may operate in an autonomous mode, a semi-autonomous mode, or a non-autonomous mode. For purposes of this disclosure, an autonomous mode is defined as one in which each of a vehicle propulsion, braking, and steering are controlled by the computer 60; in a semi-autonomous mode the computer 60 controls one or two of the vehicle propulsion, braking, and steering; in a non-autonomous mode, a human operator controls the vehicle propulsion, braking, and steering.

Figure 5:
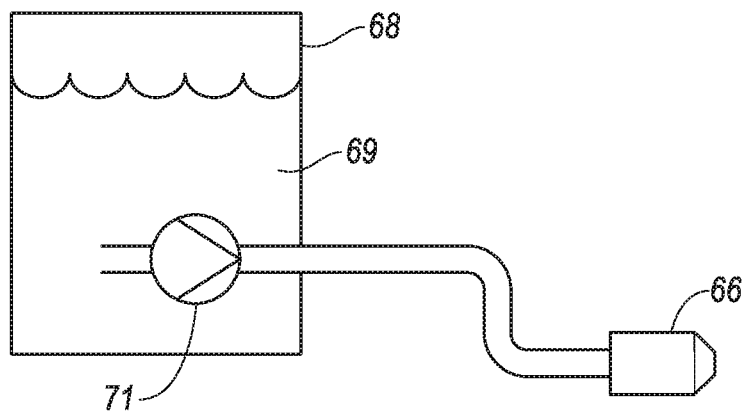
FIG. 5 is a schematic of a washer system of the example vehicle and a nozzle of the example sensor system.

The washer system 68, shown in FIGS. 5 and 6, includes components known for delivering fluid to various surfaces of the vehicle 22, e.g., to a surface of a windshield. The washer system 68 may include a fluid reservoir 69 and a fluid pump 71. The fluid reservoir 69 and the pump 71 are in fluid communication with the nozzles 66 such that the washer system 68 actuates the pump 71 to move fluid from the fluid reservoir 69 to the nozzles 66, e.g., in response to receiving an instruction from the computer 60.

The user interface 70, shown in FIG. 6, presents information to, and receives information from, an occupant of the vehicle 22. The user interface 70 may be located, e.g., on an instrument panel in a passenger cabin of the vehicle 22, or wherever may be readily seen by the occupant. The user interface 70 may include dials, digital readouts, screens such as a touch-sensitive display screen, speakers, and so on for providing information to the occupant, e.g., human-machine interface (HMI) elements. The user interface 70 may include buttons, knobs, keypads, microphone, and so on for receiving information from the occupant.

The in-vehicle communication network 72, shown in FIG. 6, includes hardware, such as a communication bus, for facilitating communication among sensor system 20 and vehicle 22 components. The in-vehicle communication network 72 may facilitate wired or wireless communication among the vehicle 22 and sensor system 20 components in accordance with a number of communication protocols such as controller area network (CAN), Ethernet, WiFi, Local Interconnect Network (LIN), and/or other wired or wireless mechanisms.

The computer 60, shown in FIG. 6, may be a microprocessor-based computer 60 implemented via circuits, chips, or other electronic components. For example, the computer 60 may include a processor, a memory, etc. The memory of the computer 60 may include memory for storing programming instructions executable by the processor as well as for electronically storing data and/or databases. The computer 60 is generally configured for communications with the sensor system 20 and vehicle 22 components, on a controller area network (CAN) bus, e.g., the in-vehicle communication network 72, and for using other wired or wireless protocols to communicate with devices outside the vehicle 22, e.g., Bluetooth®, IEEE 802.11 (colloquially referred to as WiFi), satellite telecommunication protocols, and cellular protocols such as 3G, LTE, etc. Via the in-vehicle communication network 72 the computer 60 may transmit messages, information, data, etc., to various devices and/or receive messages, information, data, etc., from the various devices. Although the computer 60 is shown as a component of the vehicle 22, it is to be understood that the computer 60 could be a component of the sensor system 20, e.g., in communication with the components of the sensor system 20 and supported by the base 24. Although one computer 60 is shown in FIG. 6 for ease of illustration, it is to be understood that the computer 60 could include, and various operations described herein could be carried out by, one or more computing devices.

The computer 60 may be programmed to actuate the transparent shield 32 between the first position and the second position. For example, the computer 60 may transmit an instruction to the linear actuator 54, or other device used to move the transparent shield 32, via the in-vehicle communication network 72. The instruction may instruct the linear actuator 54 to change length, e.g. to lengthen or shorten.

The computer 60 may actuate the transparent shield 32 in response to a user input to the user interface 70. For example, the computer 60 may receive the user input from the user interface 70 via the in-vehicle communication network 72. Upon receiving the user input, the computer 60 may transmit the instruction to the linear actuator 54.

The computer 60 may actuate the transparent shield 32 upon a determination that the transparent shield 32 is contaminated. The computer 60 may determine the transparent shield 32 is contaminated based on information received from the optical sensor 36, e.g., via the in-vehicle communication network 72, e.g., using image recognition processes and methods.

Figure 7:
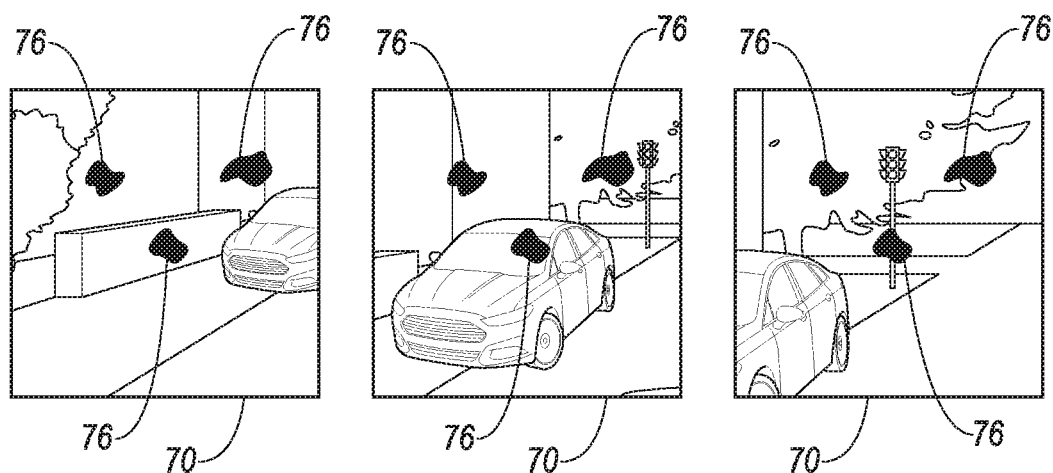
FIG. 7 is an illustration of example images captured by the example sensor system of FIG. 1.

For example, the computer 60 may compare images 74, shown in FIG. 7, received from the optical sensor 36 with each other and identify an artifact 76 that is consistent among the images 74, e.g., dirt on the transparent shield 32 will appear in a consistent location on the images 74 while a remainder of the images 74 will change. Upon identification of a threshold amount, e.g., a number, a total area, etc., of artifacts 76 the computer 60 may determine the transparent shield 32 is contaminated. For example, the area of the artifacts 76 may be compared to a threshold area, e.g., 5 percent of the field of view FV. The number of artifacts 76 may be compared to a threshold amount, e.g., 10 artifacts 76. When the area and/or number of artifacts 76 is greater than the threshold area and/or threshold amount, the computer 60 may determine the transparent shield 32 is contaminated.

For example, the computer 60 may identify the images 74 as being of low quality, e.g., a low resolution resulting from the contamination on the transparent shield 32 interfering with focusing light on the optical sensor 36. The computer 60 may identify a quality of the image 74, e.g. an image resolution. The computer 60 may compare the quality of the image 74 with a quality threshold e.g., a threshold image resolution value. When the quality of the image 74 is less than the quality threshold the computer 60 may determine the transparent shield 32 is contaminated. Other techniques and processes, e.g., image recognition techniques and processes, may be used to determine that the transparent shield 32 is contaminated.

The computer 60 may actuate the transparent shield 32 at time intervals. For example, the computer 60 may transmit an instruction to the linear actuator 54 to move the transparent shield 32 to the first position, wait a determined amount of time, e.g. 10 minutes, then transmit an instruction to the linear actuator 54 to move the transparent shield 32 to the second position, and so on.

The computer 60 may be programmed to actuate movement of the pads 30. For example, the computer 60 may transmit an instruction to the motor 64, or other device used to move the pads 30, via the in-vehicle communication network 72. The instruction may instruct the motor 64 to an "on" state, e.g., to rotate.

The computer 60 may be programed to concurrently actuate the transparent shield 32 from the first position to the second position, or vice versa, and movement of the pads 30. For example, the computer 60 may instruct the motor 64 to the "on" state. While the motor 64 is in the "on" state, the computer 60 may instruct the linear actuator 54 to length or shorten.

The computer 60 may actuate movement of the pads 30 after actuation of the transparent shield 32. For example, the computer 60 may first instruct the linear actuator 54 to length or shorten. After the linear actuator 54 has completed actuating, the computer 60 may instruct the motor 64 to the "on" state.

The computer 60 may be programmed to actuate the nozzles 66 to provide fluid to one or more of the pads 30. For example, the computer 60 may transmit an instruction to the washer system 68, e.g., via the in-vehicle communication network 72. The instruction to the washer system 68 may instruct the washer system 68 to provide fluid to the nozzles 66. For example, the instruction may instruct the pump 71 to an "on" state, e.g., to move fluid.

Figure 8:
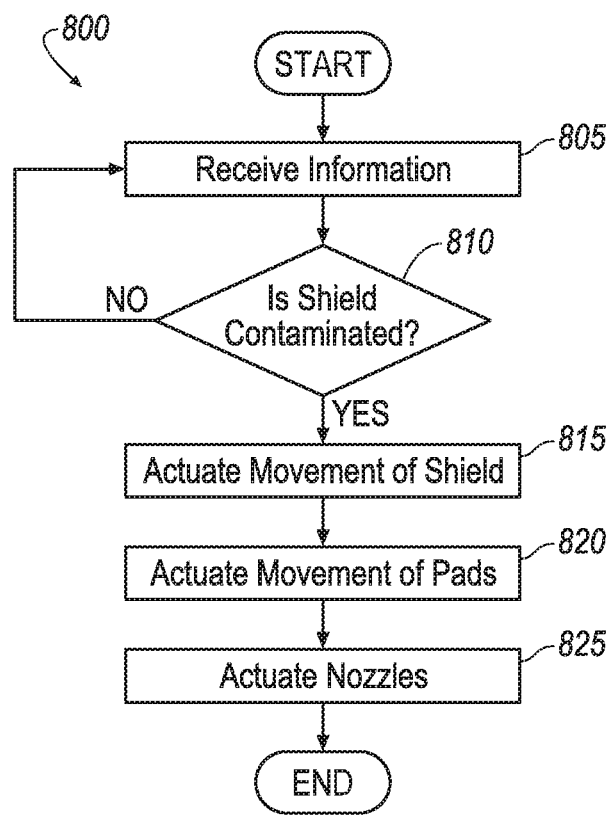
FIG. 8 is a process for operating the example sensor system of FIG. 1.

FIG. 8 is a process flow diagram illustrating an exemplary process 800 for operating the sensor system 20. The process 800 may be executed by the computer 60. The process 800 begins in a block 805 in which the computer 60 receives information, e.g., images 74 from the optical sensor 36, the user input from the user interface 70, etc., e.g., via the in-vehicle communication network 72. The computer 60 may continue to receive data throughout the process 800. Throughout the process 800 means substantially continuously or at time intervals, e.g., every 200 milliseconds.

At a block 810 the computer 60 determines whether transparent shield 32 is contaminated, as described herein. Upon a determination that the transparent shield 32 is contaminated the process moves to a block 815. Upon a determination that the transparent shield 32 is not contaminated the process returns to the block 805.

At the block 815 the computer 60 actuates the transparent shield 32 to move from the first position to the second position, or vice versa, as described herein. In addition, or as an alternative, to actuating the transparent shield 32 upon the determination in the block 810, the computer 60 may actuate the transparent shield 32 in response to the user input to the user interface 70, at time intervals, etc., as described herein.

At a block 820 the computer 60 actuates movement of the pads 30, as described herein. Actuating movement of the pads 30 may be executed before, during, and/or after actuating movement of the transparent shield 32.

At a block 825 the computer 60 actuates the nozzles 66 to provide fluid to the pads 30, as described herein. Actuating the nozzles 66 may be executed before, during, and/or after actuating movement of the transparent shield 32 and/or the pads 30. After the block 825 the process 800 may end. Alternately, the process may return to the block 805.

The adjectives "first" and "second" are used throughout this document as identifiers and are not intended to signify importance or order.

As used herein a computing device, e.g., a computer, includes a processor and a memory. The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor can receive the data and execute the processes described herein.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors. The memory may store program instruction executable by the processor to perform the processes described herein.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The phrase "based on" encompasses being partly or entirely based on.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
   a base defining an opening;
   a pair of gaskets supported by the base, the opening disposed between the gaskets;
   a pair of pads supported by the base, the gaskets disposed between the pads, the pads movable relative to the base and the shield while supported by the base; and
   a transparent shield supported by the base and movable between a first position and a second position, the shield abutting one of the pads in the first position and the other of the pads in the second position.

2. The system of claim 1, wherein the base includes a first beveled surface and a second beveled surface opposite the first beveled surface, the opening disposed therebetween.

3. The system of claim 1, further comprising an optical sensor defining a field of view, the opening and the transparent shield in the first position and the second position located within the field of view.

4. The system of claim 1, further comprising a shaft rotatably supported by the base, wherein each of the pads defines a loop disposed around the shaft.

5. The system of claim 1, further comprising a nozzle positioned to provide fluid to at least one of the pads.

6. The system of claim 1, wherein the gaskets extend in a direction that is perpendicular to movement of the shield from the first position to the second position.

7. The system of claim 1, further comprising a user interface and a computer programmed to actuate the shield between the first position and the second position in response to a user input to the user interface.

8. The system of claim 1, further comprising a computer programmed to actuate the shield between the first position and the second position upon a determination that the shield is contaminated.

9. A system comprising:
   a base defining an opening;
   a pad supported by the base;
   a transparent shield supported by the base and movable between a first position and a second position, the shield covering the opening in the first position and abutting the pad in the second position;
   a shaft rotatably supported by the base, wherein the pad defines a loop disposed around the shaft;
   a second shaft spaced from the shaft, the loop disposed around the second shaft, and the opening located between the shaft and the second shaft; and
   the pad is movable relative to the base and the shield.

10. The system of claim 9, further comprising a second pad spaced from the pad and movable relative to the base and the shield, the opening disposed between the pad and the second pad.

11. The system of claim 9, further comprising a gasket disposed between the pad and the opening.

12. The system of claim 9, further comprising a nozzle positioned to provide fluid to the pad.

13. The system of claim 9, wherein movement of the pad defines a direction that is perpendicular to movement of the shield between the first position and the second position.

14. The system of claim 9, further comprising an optical sensor defining a field of view, the opening and the transparent shield in the first position and the second position located within the field of view.

15. The system of claim 9, further comprising a computer programmed to concurrently actuate the shield from the first position to the second position and movement of the pad.

16. The system of claim 9, further comprising a computer programmed to actuate the shield from the first position to the second position and to actuate movement of the pad after actuation of the shield.

17. The system of claim 9, further comprising a computer programmed to actuate the shield between the first position and the second position at time intervals.

18. A system comprising:
    a base defining an opening;
    a pair of gaskets supported by the base, the opening disposed between the gaskets;
    a pair of pads supported by the base, the gaskets disposed between the pads;
    a shaft rotatably supported by the base, wherein each of the pads defines a loop disposed around the shaft; and a transparent shield supported by the base and movable between a first position and a second position, the shield abutting one of the pads in the first position and the other of the pads in the second position.

* * * * *